United States Patent [19]
Miyase et al.

[11] Patent Number: 6,025,565
[45] Date of Patent: Feb. 15, 2000

[54] LEVER SWITCH FOR VEHICLES

[75] Inventors: Yasuo Miyase; Norio Uchiyama, both of Tokyo, Japan

[73] Assignee: Niles Parts Co., Ltd., Japan

[21] Appl. No.: 09/252,066

[22] Filed: Feb. 18, 1999

[30]     Foreign Application Priority Data

Feb. 27, 1998 [JP]  Japan ................................. 10-064158

[51] Int. Cl.⁷ ............................................... H01H 9/00
[52] U.S. Cl. ..................... 200/61.28; 200/61.54
[58] Field of Search ............................. 200/61.28, 61.27, 200/61.54, 335, 564

[56]                 References Cited

U.S. PATENT DOCUMENTS

| | | | |
|---|---|---|---|
| 5,661,276 | 8/1997 | Shibata ................................ | 200/61.54 |
| 5,708,242 | 1/1998 | Uchiyama ........................... | 200/61.54 |
| 5,859,396 | 1/1999 | Yokoyama ......................... | 200/61.27 |
| 5,900,601 | 5/1999 | Uchiyama ........................... | 200/61.27 |

FOREIGN PATENT DOCUMENTS 5-21797   6/1993   Japan .

*Primary Examiner*—Michael L. Gellner
*Assistant Examiner*—Nhung Nguyen
*Attorney, Agent, or Firm*—Rader, Fishman & Grauer; Ronald P. Kananen

[57]                    ABSTRACT

A lever switch for vehicles has a first lever 6, a second lever 7, and a third lever 5. The first lever 6 is provided with a first operation rod 9 for operating a first movable member 18 disposed on a pole board 22. The second lever 7 is provided with a second operation rod 7f for operating a second movable member 19 disposed on the pole board 22. The third lever 5 is provided with a third operation rod 5a for operating a third movable member 17 disposed on the pole board 22. The lever switch provides two rotary knobs mounted on a single operation lever assembly and is made compact and slim in formation.

14 Claims, 5 Drawing Sheets

LEVER SWITCH FOR VEHICLES

BACKGROUND OF THE INVENTION

1. Field of the Invention

The present invention relates generally to lever switches for vehicles and, in particular, to a lever switch having two rotary knobs mounted on a single operation lever assembly, and movable members operated by the levers of the operation lever assembly and the rotary knobs disposed on a surface of a pole board.

2. Description of the Related Art

A conventional lever switch related to the present invention is disclosed, for example, in Japanese Utility Model Publication No. HEI 5-21797. The conventional lever switch has two rotary knobs mounted at an end point of an operation lever. One of the rotary knobs is provided for controlling a front wiper, and the other rotary knob is provided for controlling a rear wiper. Movable contact plates, contact springs, and a base operated by the two rotary knobs are provided at the end point of the operation lever.

The conventional lever switch described above has problems caused by the movable contact plates, the contact springs, and the base being disposed at the end of the operation lever. Due to this construction, the operation lever is relatively bulky as a whole and complex in construction, and the number of parts and man-hours for assembling are increased, thereby increasing the assembling cost.

SUMMARY OF THE INVENTION

An object of the present invention is to provide an improved lever switch for vehicles that solves the problems with the conventional lever switch described above.

A further object of the present invention is to provide a lever switch for vehicles having an operation lever assembly with two rotary knobs that is simple in construction and slim in formation.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to achieve the objects set forth above, a lever switch for vehicles is provided having a first lever, a second lever and a third lever. The lever switch is characterized in that the first lever is provided with a first operation rod for operating a first movable member disposed on a pole board; the second lever is provided with a second operation rod for operating a second movable member disposed on the pole board; and the third lever is provided with a third operation rod for operating a third movable member disposed on the pole board.

According to another aspect of the present invention, the first movable member, the second movable member, the third movable member, and a fourth movable member are disposed slidably on a surface of the pole board side-by-side, and the length in the direction perpendicular to the first, second, and third levers, of each of the first movable member, the second movable member, the third movable member, and the fourth movable member, is longer than the width in the axial direction thereof.

According to a further aspect of the present invention, the first lever preferably has a shaft rotatably inserted into the cylinder section of the second lever, and the third lever has a cylinder section into which the cylinder section of the second lever is inserted.

According to other aspects of the present invention, the first, second, third, and fourth operation rods are disposed above the compartment of a case and are inserted into a first through hole, a second through hole, a third through hole and a fourth through hole, respectively, bored in a movable base of the case; and the first, second, third, and fourth movable members are respectively guided along a first guide wall, a second guide wall, a third guide wall and fourth guide walls formed on a lower surface of the compartment.

According to further aspects of the present invention, the lever switch has a lever projected out of a case passed through a first notch section formed on an inner wall of the case, the lever being formed integrally with a boot having an opening for covering the first notch section. The boot of the lever is formed such that the opening is formed in an approximately half-ball shape having a center which is a swing axis of the lever approximately. The case is provided with a second notch section outside the first notch section. A boot receiving space for receiving the boot swingably is provided between the first notch section and the second notch section. The boot receiving space of the case is covered together with the case by a cover member having a boot covering section for covering the boot.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENTS

A lever switch according to a preferred embodiment of the present invention will now be described in detail with reference to FIGS. 1 to 5 of the accompanying drawings.

Figure 1:
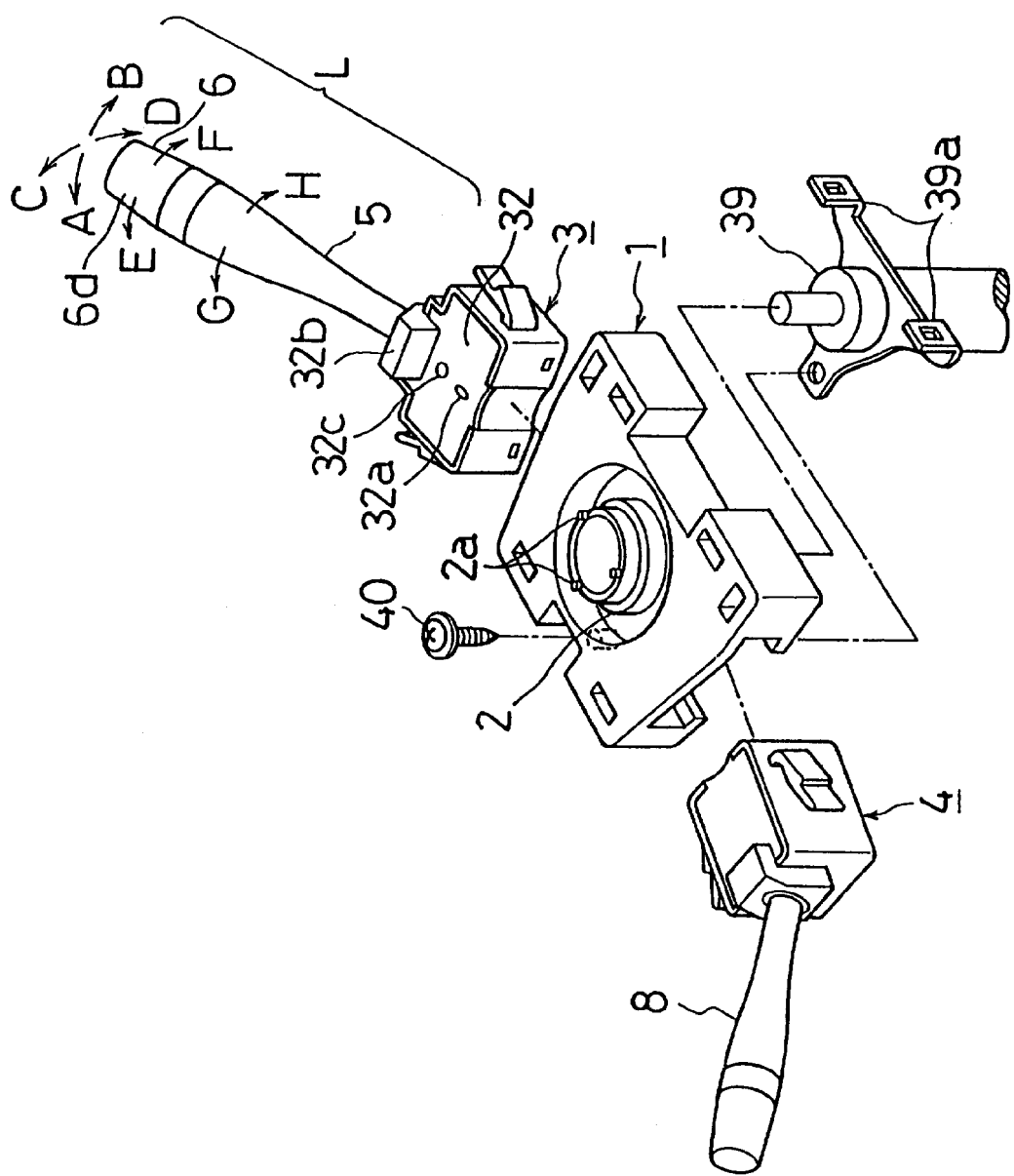
FIG. 1 is an exploded perspective view showing a vehicle switch assembly having a lever switch according to a preferred embodiment of the present invention.

As shown in FIG. 1, a body 1 for combination switches used for automobiles is coupled with a bracket 39a of a steering column 39 and fixed by using a fixing screw 40. The body 1 rotatably supports a cylindrical tube 2 with canceling pins 2a at its central portion. A first switch 3 and a second switch 4 are inserted into the right side and the left side of the body 1, respectively. The first switch 3 functions, for example, as a turn signal switch, a passing switch, a main/dimmer switch, a head light switch, and a fog lamp switch. Moreover, the first switch 3 supports an operation lever assembly L composed of a first lever 6, a second lever 7, a third lever 5 and a fixed knob 14 swingably in the directions A, B, C or D.

Figure 2:
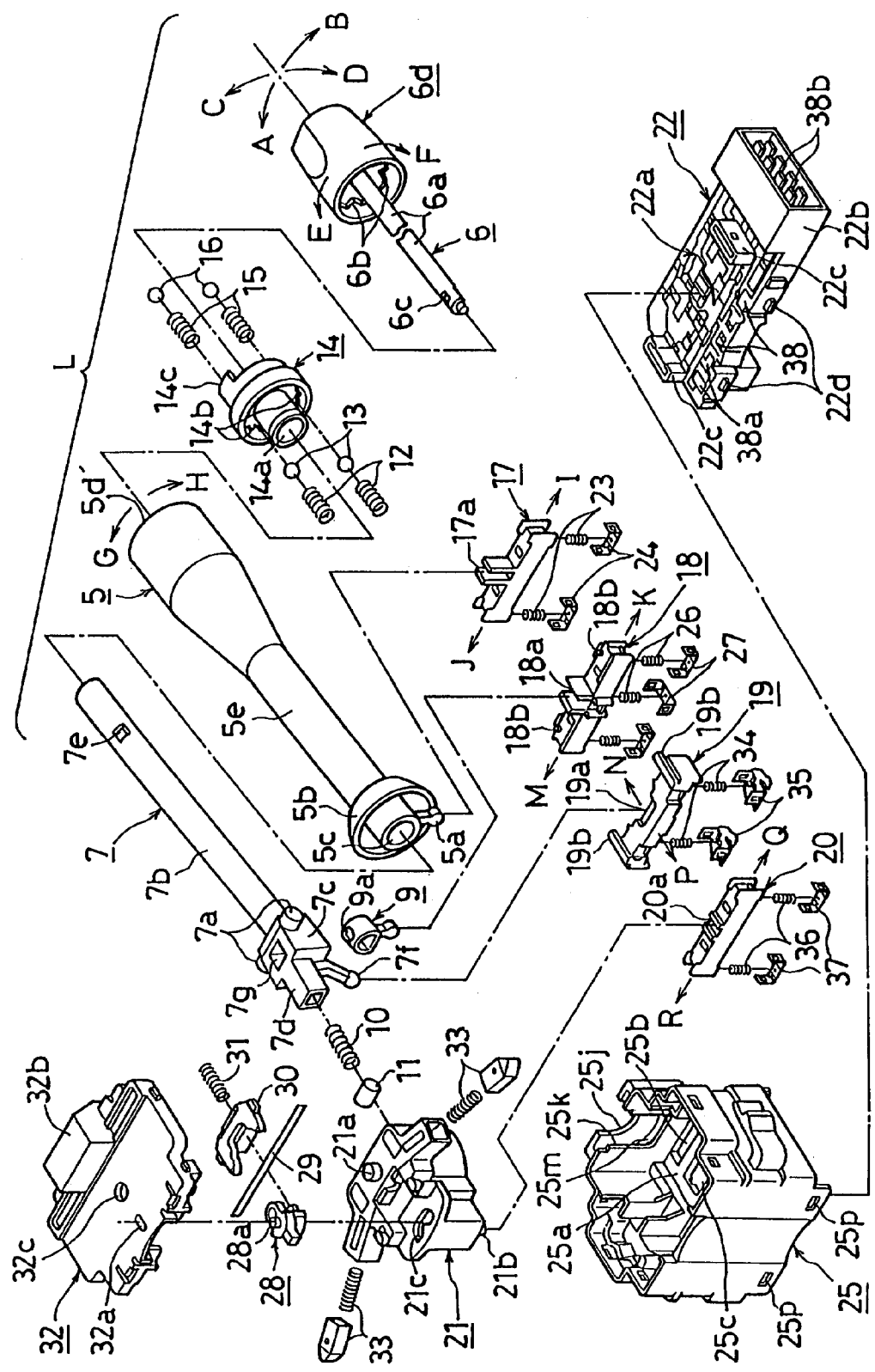
FIG. 2 is an exploded perspective view of the lever switch according to the preferred embodiment of the present invention.

The first switch 3 functions as a turn signal switch for a blinker when the third lever 5 is moved in the direction shown by the arrows A or B, as shown in FIG. 2. The first switch 3 functions as a passing switch for temporarily energizing the head lamps when the third lever 5 is moved in the direction shown by the arrow C. Moreover, the first switch 3 functions as a main/dimmer switch for switching the main light or the dimmer light of the head lamp when the third lever 5 is moved in the vertical direction shown by the arrows C or D.

The first switch 3 functions as a head lamp switch for turning on and off the head lamps and the small lamps when the first lever 6 mounted at the end of the third lever 5 is rotated in the direction shown by the arrows E or F. Moreover, the first switch 3 functions as a fog lamp for switching the fog lamps when the third lever 5 is rotated in the direction shown by the arrows G or H.

The second switch 4 supports swingably an operation lever 8 that functions, for example, as a wiper/washer switch. The operation lever 8 is movable in the directions shown by the arrows A, B, C or D as is similar to the third lever 5, and the operation lever 8 is provided with the rotary switch including a wiper volume, a rear wiper switch, and the like at the end of the operation lever 8.

As shown in FIG. 2, when the third lever 5 of the first switch 3 is moved around the shaft 6a of the first lever 6 in the direction shown by the arrows C or D, the third operation rod 5a switches the third movable member 17 for switching the fog lamps in the straight direction shown by the arrows I or J. The third lever 5 has a cylinder section 5e located at the central portion thereof, the third operation rod 5a and boot 5b located at one end thereof, and a flared opening 5d at the other end thereof. The third lever 5 is formed as a megaphone-shaped member in which the cylinder section 5e of the second lever 7 is inserted into the through hole 5c of the third lever 5.

The flared opening portion 5d of the third lever 5 is formed in the shape of megaphone at the end side of the rotary knob 6d. The opening portion 5d is provided with the rotary knob 6d through click springs 12 and click members 13. The cylinder section 5e is inserted into the third lever 5, and the third lever 5 is movably held through the base end section 7c of the second lever 7 and the fixed knob 14 mounted at the end of the second lever 7.

The third operation rod 5a is disposed between two contact projections 17a and 17a of the third movable member 17. The boot 5b is provided with a half-ball shape opened opposite to the center of swing movement of the third lever 5, and is formed integral with the third lever 5. The boot 5b is disposed swingably within a boot receiving space 25m formed between the notch section 25k and the second notch section 25j of the case 25. Therefore, the boot 5b can cover the gap formed between the notch section 25k and the second notch section 25j of the case 25. Thus, the boot receiving space 25m can receive the boot 5b swingably, and is covered by the cover member 32.

The second lever 7 is provided with a click supporting cylinder 7d at one end thereof for disposing the click spring 10 and a click member 11, and a contact hole 7e at the other end thereof for being contacted with a claw (not shown) formed within the cylinder shaft section 14a of the fixed knob 14. The second lever 7 is integrally formed with a second operation rod 7f adapted to be contacted to the longitudinal hole 19a of the second movable member 19 at the lower side adjacent to the click supporting cylinder 7d.

The shaft 6a of the first lever 6 is rotatably inserted into the cylinder section 7b of the second lever 7, and the cylinder section 7b is rotatably inserted into the third lever 5. When the rotary knob 6d is moved in the direction shown by the arrows C or D, the second lever 7 can swing around the shaft 7a together with the first lever 6 and the third lever 5, and the second operation rod 7f moves the second movable member 19 in the direction shown by the arrows N or P, thereby switching the main/dimmer light or the passing light, respectively. The second operation rod 7f passes through the third through hole 25h bored on the compartment 25a and contacts the longitudinal hole 19a of the second movable member 19.

The rotary knob 6d is formed integrally with the central shaft 6a of the first lever 6 at its one end, and the first operation rod 9 is fitted to the other end of the shaft 6a. The shaft 6a of the first lever 6 is inserted into the cylinder section 7b of the second lever 7. The claw 6c mounted on the end point of the shaft 6a is coupled with the first operation rod 9 within the through hole 7g so that the first lever 6 can rotate together with the first operation rod 9. When the rotary knob 6d of the first lever 6 is rotated in the direction shown by the arrows E or F, the first operation rod 9 moves the first movable member 18 in the straight direction shown by the arrows K or M, thereby switching the head lamps.

The first operation rod 9 is fixed on the end portion of the shaft 6a in such a manner that the claw 6c mounted on the end portion of the first lever 6 is coupled with the contact hole 9a within the through hole 7g. The first operation rod 9 rotates together with the first lever 6 and the shaft 6a, and the rotation of the first lever 6 is converted into the straight movement of the first movable member 18 so that the first movable member 18 is contacted with the contact projector 18a.

The click member 11 is received in the click supporting cylinder 7d and pressed to the click slit 21d formed in the inner wall of the movable base 21 by utilizing the click spring 10. The click springs 12 are coil springs for energizing the click members 13, respectively, and are resiliently received in the blind holes bored in the opening portion 5d. The click members 13 are used for giving a click feeling to the third lever 5 by pressing it to the click slits 14b of the fixed knob 14.

The fixed knob 14 is a fixed member formed in a ring-like shape and mounted at the end of the cylinder section 7b. The fixed knob 14 is formed with the cylinder shaft section 14a to be fitted to the cylinder section 7b at the side of the third lever 5, and the click slits 14b to which the click members 13 are pressed by the resilient force of the click springs 12. Moreover, the fixed knob 14 is formed with a blind hole (not shown) for supporting the click springs 15 for energizing the click members 16 to the click slits 6b, and the projection 14c for limiting the rotation region of the first lever 6 at the side of the first lever 6.

The first movable member 18, the second movable member 19, the third movable member 17 and the fourth movable member 20, as shown in FIG. 2, are disposed on the surface 22a of the pole board 22 in parallel, and each of them is formed as a longitudinal member so that the length in the direction perpendicular to the operation lever L is longer than the width in the axial direction thereof.

The third movable member 17 is formed as the longitudinal member so that the length in the direction perpendicular to the operation lever L is longer than the width in the axial direction thereof. Moreover, the third movable member 17 is disposed on the surface 22a of the pole board 22 and disposed between the first guide walls 25d located under the compartment 25a of the case 25, thereby making possible the movement of the third movable member 17 in the direction shown by the arrows I or J. On the lower surface of the third movable member 17, the movable contacts 24 used as the fog lamp switch are set through the contact springs 23. When the third lever 5 is rotated in the direction shown by the arrows H or G, the third movable member 17 is moved on the surface 22a in the direction shown by the arrows I or J together with the contact springs 23 and the movable contacts 24, thereby switching the fog lamps. The contact projections 17a are composed of two plate-like projections projected from a central position of the upper surface of the third movable member 17. The first movable member 18 is formed as a longitudinal member so that the length in the moving direction, as shown by the arrows K or M (i.e., in the direction perpendicular to the operation lever L) is longer than the width in the axial direction thereof. On the lower surface of the first movable member 18, the movable contacts 27 used as the head lamp switch are set through the contact springs 26. When the first lever 6 is rotated in the direction shown by the arrows E or F, the first movable member 18 is moved on the surface 22a of the pole board 22 in the direction shown by the arrows K or N, thereby switching the head lamps.

The contact projections 18a are composed of two plate-like projections projected from the upper surface of the first movable member 18 at the central position of the upper surface. The contact projection 18a is inserted into the second through hole 25c bored in the compartment 25a of the case 25, thereby moving in the direction shown by the arrows N or P. A cylindrical pin 18b is formed at the left and right sides of the upper surface of the first movable member 18. The pins 18b are fitted to the first guide slit 25e mounted on the lower surface of the compartment 25a of the case 25, thereby moving only in the straight direction shown by the arrows K or M.

The second movable member 19 is formed as the longitudinal member having a smaller width in the moving direction, as shown by the arrows N or P (i.e., in the direction perpendicular to the operation lever L). The second movable member 19 holds the movable contacts 35 used as main/dimmer switch and the passing switch through the contact springs 34 on the lower surface thereof. Moreover, when the third lever 5 is moved in the direction shown by the arrows C or D, the second movable member 19 moves together with the movable contacts 35 on the surface 22a of the pole board 22 in the straight direction N or P.

Figure 3:
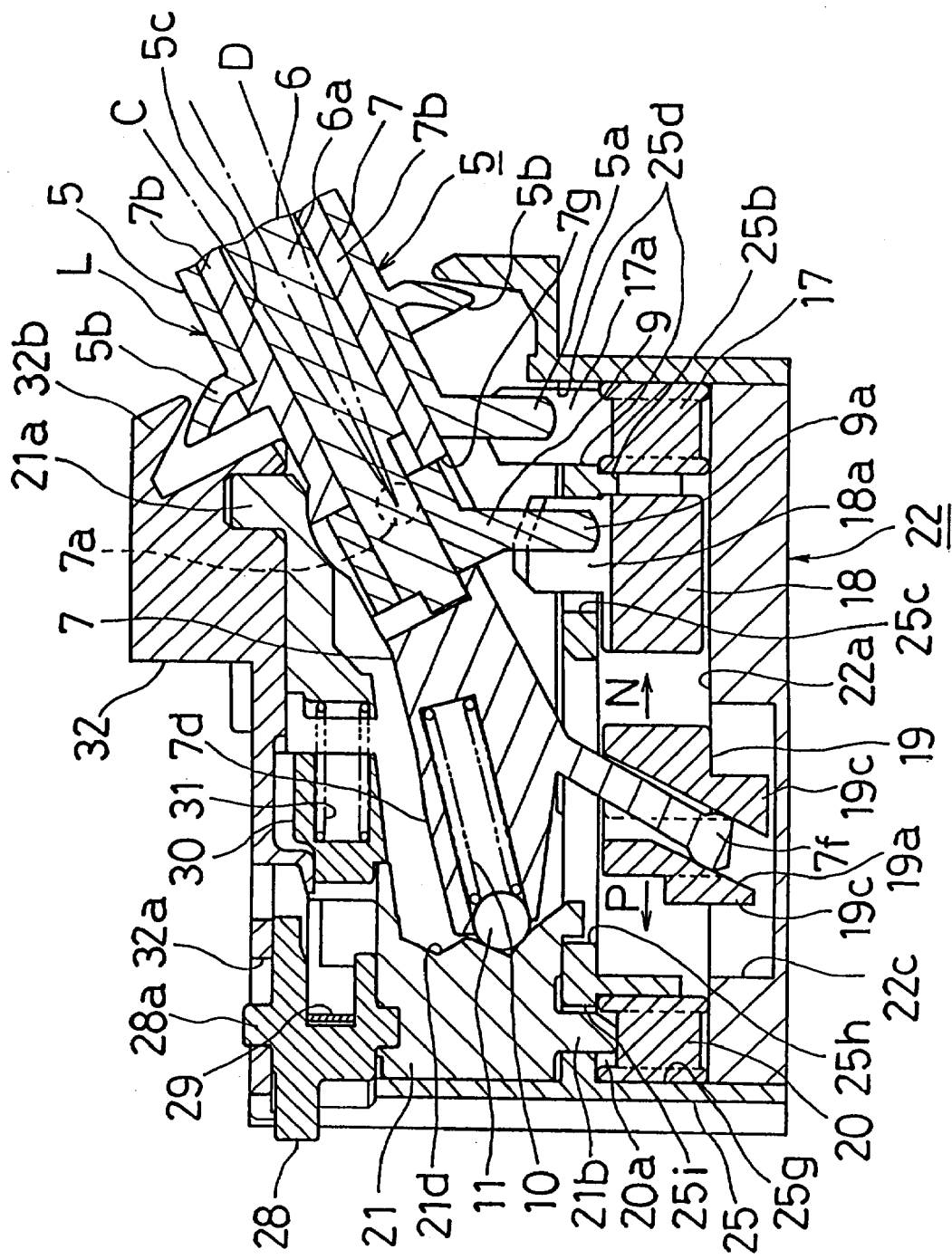
FIG. 3 is an enlarged cross-sectional view showing a main part of the lever switch of the present invention in an assembling state.
Figure 4:
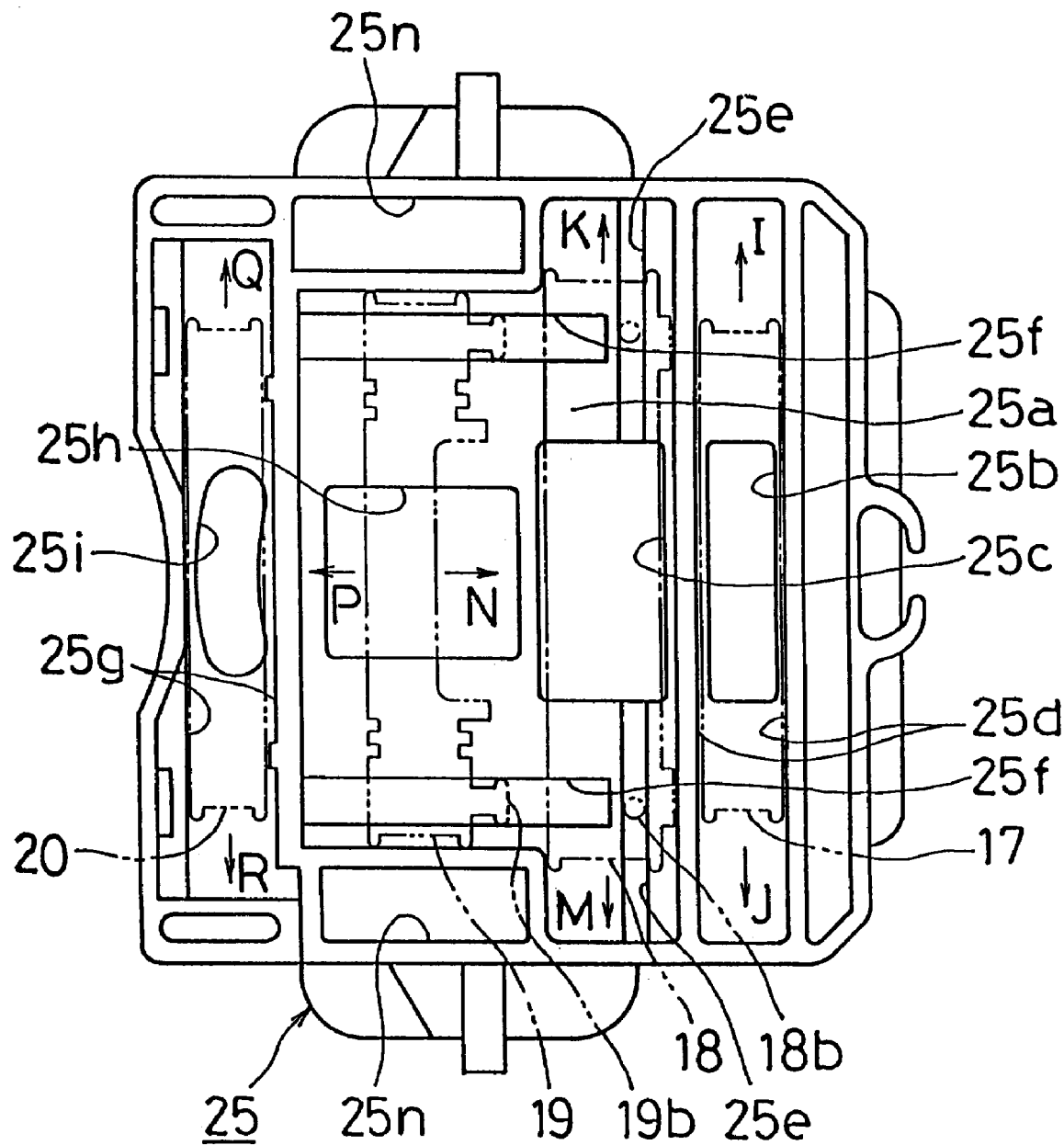
FIG. 4 is an enlarged bottom view showing a case of the lever switch of the present invention.
Figure 5:
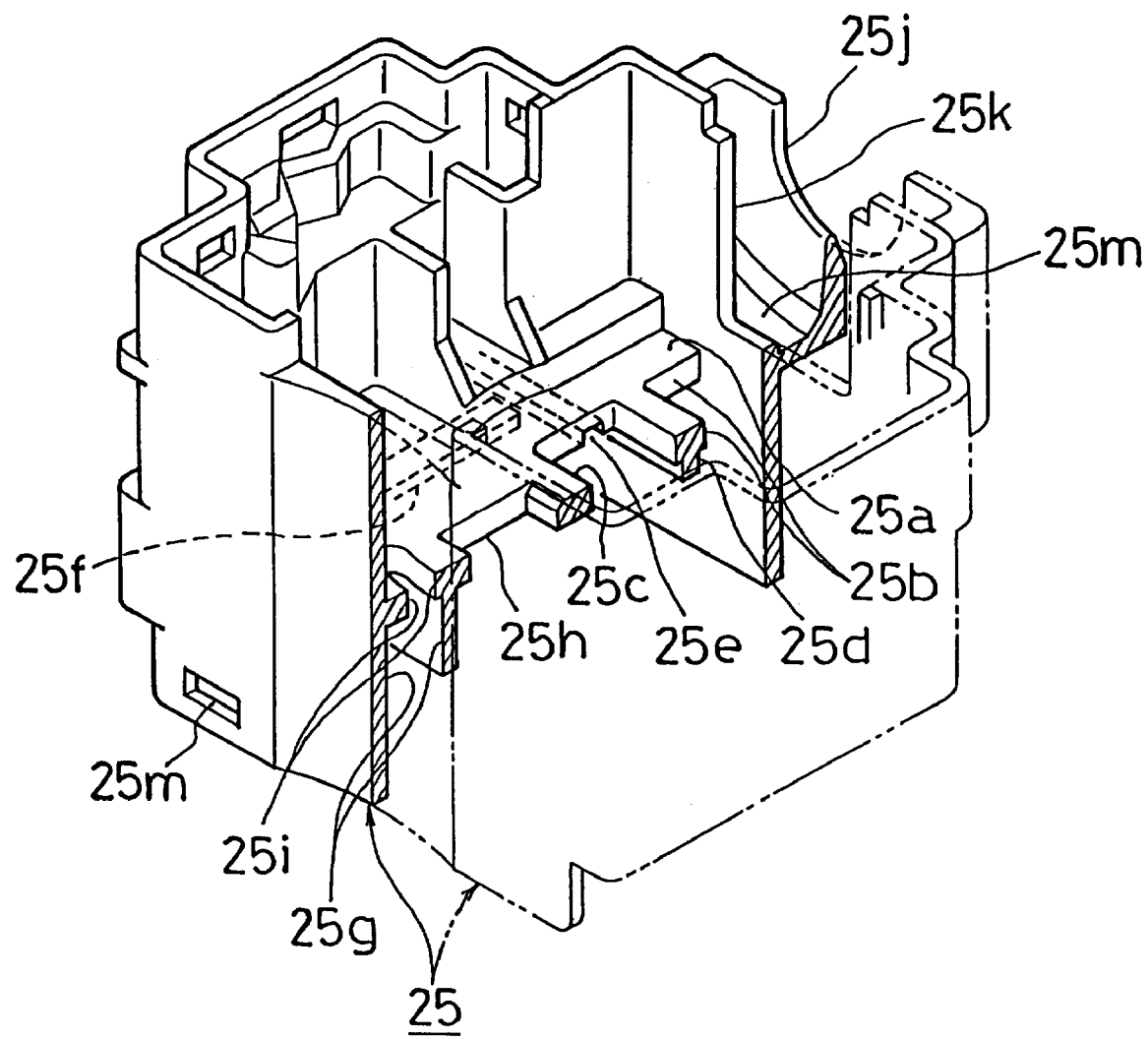
FIG. 5 is an enlarged perspective view showing a case of the embodiment of the present invention in which the central portion thereof is shown as a sectional view.

The longitudinal hole 19a of the second movable member 19 is formed as a slanted hole as shown in FIG. 3, and the distance the second movable number 19 is moved due to the second operation rod 7f is increased. As shown in FIG. 3, the second movable member 19 has a projection 19c located at the lower-end thereof and adapted to be contacted with the guide slit 22c formed on the surface 22a of the pole board 22. When the third lever 5 is moved in the direction shown by the arrows A or B, the second operation rod 7f moves within the longitudinal hole 19a without affecting any member and, therefore, the second movable member 19 does not move. The longitudinal hole 19a may be a blind hole or a through hole.

A guide arm 19b, as shown in FIG. 2, prevents the second movable member 19 from slanting when the guide arm 19b is sliding along the second guide slit 25f formed on the lower surface of the compartment 25a of the case 25. The guide arm 19b is a rod-shaped member formed in the direction shown by the arrows N and P.

The fourth movable member 20 is formed as a longitudinal member so that the length in the moving direction shown by the arrows Q or R (i.e., in the direction perpendicular to the operation lever L) is longer than the width in the axial direction thereof. The fourth movable member 20 holds the movable contacts 37 for the turn signal switch through the contact springs 36 on the lower surface. Moreover, the fourth movable member 20 is disposed on the surface 22a of the pole board 22, and disposed between the guide walls 25g located under the compartment 25a of the case 25. Further, the second operation rod. 7f is contacted with the contact section 20a on the upper surface thereof, thereby making possible the movement of the fourth movable member 20 only in the direction shown by the arrows Q or R.

When the third lever 5 is moved in the direction shown by the arrows A or B, the fourth movable member 20 moves on the surface 22a of the pole board 22 together with the second operation rod 7f in the direction shown by the arrows Q or R.

The contact section 20a is composed of, for example, two rail-shaped projections. When the third lever 5 is swung in the direction shown by the arrows C or D, the fourth operation rod 21b moves within the longitudinal hole 20a without affecting any other member and, therefore, the fourth movable member 20 does not move.

The movable base 21 has click members 33 at the left side and the right side with resilient force, and rotates around the shaft 21a as a rotation center in the direction shown by the arrows A or B together with the first lever 6, the second lever 7 and the third lever 5. Moreover, the movable base 21 has the fourth operation rod 21b adapted to be contacted to the contact section 20a of the fourth movable member 20 and projected to the lower portion thereof. The fourth operation rod 21b is contacted to the contact section 20a of the fourth movable member 20 by passing through the fourth through hole 25i bored on the compartment 25a. When the third lever 5 is moved in the direction shown by the arrows A or B, the fourth operation rod 21b moves the fourth movable member 20 in the straight direction shown by the arrows Q or R, thereby switching the blinkers.

The case 25 is covered by the cover member 32 through the movable base 21 located above the compartment 25a, the cancel cam 28, the plate spring 29, the cam guide 30, and the coil spring 31. The case 25 for receiving the above-mentioned parts is coupled with the body 1 and then fixed by using screws.

The cancel cam 28 has a shaft 28a the lower side of which is fitted to the slit 21c of the movable base 21, and the upper side of which is fitted to the longitudinal hole 32a of the cover member 32. The plate spring 29 presses the cancel cam 28 by the central portion of the plate spring 29, both ends of which are held by the cover member 32. The cam guide 30 positioned on the movable base 21 is urged toward the cancel cam 28 by using the coil spring 31. The cover member 32 is fitted to, and covers, the upper opening of the case 25.

The pole board 22 is formed with the connector section 22b integrally and with the insert-molded conductive plates 38 through a plastic injection molding method, and the pole board 22 is coupled to the lower opening of the case 25. The pole board 22 has two contact projections projected from the surface 22a at both sides. The contact projections are fitted to the contact holes 25n formed on the lower side of the compartment 25a of the case 25. The claws 22d formed at the side surfaces of the projections 22c are fitted to the contact holes 25p of the case 25, respectively, thereby coupling the pole board 22 with the case 25.

The conductive plates 38 are composed of the fixed contact plates 28a disposed on the surface 22a and the terminals 38b disposed in the connector section 22b. The cover member 32 has the longitudinal hole 32a to be connected to the shaft 28a of the cancel cam 28, the shaft hole 32c to be fitted to the shaft 21a of the movable base 21, and the boot covering section 32b for covering the boot receiving space 25m. Moreover, the cover member 32 supports the spring plate 29 and the cam guide 30.

The preferred embodiment of the present invention is constructed as described above. The operation of the preferred embodiment will now be described to facilitate a complete understanding of the present invention.

When the operation lever L is moved in the direction shown by the arrows A or B, the first lever 6, the second lever 7, the third lever 5, and the movable base 21 are swung around the shaft 21a, whereby the fourth operation rod 21b moves the fourth movable member 20 in the straight direction as shown by the arrows Q or R. Therefore, the fourth movable member 20 moves in the straight direction shown by the arrows Q or R by being guided along the second guide wall 25g of the case 25, thereby switching the blinkers.

At this time, the second operation rod 7f moves within the longitudinal hole 19a without any action for affecting any member and, therefore, the second movable member 19 does not move. The first operation rod 9 is located on the same axial line as that of the shaft 21a. The first operation rod 19 moves within the contact projections 18a without any action for affecting any member and, therefore, the first movable member 18 does not move. As shown in FIG. 3, the third operation rod 5a is apart from the axis of the shaft 21a and, therefore, the third operation rod 5a rotates and moves, thereby slightly moving the third movable member 17 in the direction shown by the arrows I or J. However, since the displacement of the third movable member 17 is small, the movable contacts 24 cannot contact with the fixed contact plates 38a, respectively, and therefore there occurs no actuation. Moreover, the boot 5b swings within the boot receiving space 25m together with the third lever 5 integrally, but the inside of the case 25 cannot be seen since the boot 5b covers the notch section 25k.

When the operation lever L is swung in the direction shown by the arrows C or D, the first lever 6, the second lever 7, and the third lever 5 swing around the shaft 7a, whereby the second operation rod 7f moves the second movable member 19 in the direction shown by the arrows N or P. The second movable member 19 can move in the direction shown by the arrows N or P without any slanted condition since the guide arm 19b is guided by the second guide slit 25f of the case 25. By this, the accuracy of the straight movement of the movable contacts 35 is increased and poor connection between the movable contacts 35 and the fixed contact plates 38a, respectively, is prevented.

A dimension of the second movable member 19 can be reduced in the direction shown by the arrows N or P, which is the moving direction of the second movable member 19, because the guide arm 19b moving within the second guide slit 25f on a straight line is provided. By this, it becomes possible to arrange four movable members on the surface 22a of the pole board 22 side-by-side, thereby minimizing the size of the pole board 22, the case 25, and other related components. The first operation rod 9 moves along the inner wall surfaces between two contact projections 18a and, therefore, the first movable member 18 does not slide. Moreover, the third operation rod 5a moves along the inner wall surfaces between two contact projections 17a and, therefore, the third movable member 17 does not move. Moreover, the boot 5b swings together with the third lever 5 integrally within the boot receiving space 25m, but the inside of the case 25 cannot be seen because the boot 5b covers the notch section 25k.

When the third lever 5 is swung in the direction shown by the arrows G or H, the third lever 5 moves the third movable member 17 in the direction shown by the arrows I or J, thereby turning on or off the fog lamps. The third movable member 17 is received between the first guide walls and, therefore, the third movable member 17 moves along the first guide wall 25d in the direction shown by the arrows I or J without any deviation in displacement.

When the first lever 6 is rotated in the direction shown by the arrows E or F, the first operation rod 9 is swung together with the shaft 6a to move the first movable member 18 in the direction shown by the arrows K or N, thereby turning the head lamps and the parking lamps on or off. The first movable member 18 moves in the direction shown by the arrows K or N without any deviation in displacement because the projections 18b located at the left and right sides are contacted to the first guide slit 25c.

As mentioned above, the four movable members, i.e., the first movable member 18, the second movable member 19, the third movable member 17, and the fourth movable member 20 are formed in a longitudinal shape respectively in the same direction thereof, and they are disposed on the surface 22a of the pole board 22 side-by-side, thereby minimizing the size of the space required for receiving the movable members. By this construction, the size of the case 25 and the pole board 22 is minimized. Moreover, the first lever 6, the second lever 7, and the third lever 5 for actuating the first movable member 18, the second movable member 19, the third movable member 17, and the fourth movable member 20, respectively, are constructed rotatably as a double-cylinder arrangement. Therefore, it becomes possible to omit the movable contact plates, fixed contacts, substrates, and the like at the end point of the operation lever, and to make the operation lever L slim and reduce the number of parts and man-hours for assembling, thereby reducing the assembling cost.

The boot 5b of the third lever 5 is disposed in the boot receiving space 25m. Therefore, the gap produced between third lever 5 and the second notch section 25j is covered by the boot 5b, thereby hiding the inside of the case 25, which results in a good appearance. Moreover, the boot 5b is formed with the third lever 5 integrally and further disposed in the boot receiving space 25m provided between the notch section 25k and the second notch section 25j. Therefore, the number of parts and man-hours for assembling are not increased, and any penetration of dust into the case 25 is avoided.

The construction and operation of the lever switch of the present invention have been described in detail above. The following novel features and advantages are provided by this construction.

According to a first aspect of the invention, a lever switch for vehicles is provided having a first lever, a second lever and a third lever. The lever switch is characterized in that the first lever is provided with a first operation rod for operating a first movable member disposed on a pole board; the second lever is provided with a second operation rod for operating a second movable member disposed on the pole board; and the third lever is provided with a third operation rod for operating a third movable member disposed on the pole board. With this construction, the formation of the third lever and the first lever can be made slim, and the internal structure can be made simple.

According to a second aspect of the present invention, the first movable member, the second movable member, the third movable member, and a fourth movable member are disposed slidably on the surface of the pole board, and the length in the direction perpendicular to the first, second, and third levers of each of the first movable member, the second movable member, the third movable member, and a fourth movable member, respectively, is longer than the width in the axial direction thereof. Therefore, all of the movable members are mounted on the surface of the pole board movably and aligned in the same longitudinal direction, thereby making the pole board and the case compact. Therefore, it is possible to dispose a plurality of the movable members collectively such that the plural movable members can be disposed in the vicinity of the axis of the second lever and the movable base, and the movable contacts of the first and third movable members can be easily maintained in the OFF position when the first lever is operated in the horizontal and vertical directions.

According to a third aspect of the present invention, the first lever has a shaft rotatably inserted into the cylinder section of the second lever, and the third lever has a cylinder section into which the cylinder section of the second lever is inserted. Therefore, it becomes possible to dispose the movable members of the first and third levers on the surface of the pole board, and the rotation of the third and first levers can be easily transmitted to each of movable members disposed in the case.

According to a fourth aspect of the present invention, the first, second, third, and fourth operation rods are disposed above the compartment of a case; the first, second, third, and fourth operation rods are inserted into a first through hole, a second through hole, a third through hole and a fourth through hole, respectively, bored in a movable base of the case; and the first, second, third, and fourth movable members are respectively guided along a first guide wall, a second guide wall, a third guide wall and fourth guide walls mounted on a lower surface of the compartment. Therefore, the first movable member, the second movable member, the third movable member and the fourth movable member are prevented from vibration and deviation in position, and can be made in a strip-like shape, thereby making the switch more compact as a whole.

According to a fifth aspect of the present invention, a lever switch for vehicles is provided having a lever passed through a first notch section formed on an inner wall of the case and projected out of the case, characterized in that the lever is formed integrally with a boot having a flared opening for covering the first notch section. Therefore, dust can be prevented from penetrating into the case, and any disconnection of the contact due to dust can be avoided. Further, the number of parts and man-hours for assembly can be reduced, thereby reducing the manufacturing cost.

According to a sixth aspect of the present invention, the boot of the lever is formed such that the opening is formed in an approximately half-ball shape having a center which is a swing axis of the lever approximately. Therefore, it is possible to prevent the boot from hitting the case when the third lever is moved swingably.

According to a seventh aspect of the present invention, the case is provided with a second notch section outside the first notch section, and a boot receiving space for receiving the boot swingably is provided between the first notch section and the second notch section. Therefore, it is possible to minimize the appearance size of the case, thereby improving the appearance thereof.

According to an eighth aspect of the present invention, the boot receiving space of the case is covered together with the case by a cover member having a boot covering section for covering the boot. Therefore, it is possible to cover the boot covering section together with the case, thereby reducing the number of parts and man-hours for assembly.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. A lever switch for vehicles, comprising:
   a first lever (6) provided with a first operation rod (9) for operating a first movable member (18) disposed on a pole board (22);
   a second lever (7) provided with a second operation rod (7f) for operating a second movable member (19) disposed on said pole board (22); and
   a third lever (5) provided with a third operation rod (5a) for operating a third movable member (17) disposed on said pole board (22).

2. The lever switch for vehicles according to claim 1, wherein said first movable member (18), said second movable member (19), said third movable member (17), and a fourth movable member (20) are disposed slidably on a surface (22a) of said pole board (22) side-by-side, and a length in a direction perpendicular to a longitudinal axis of the first, second, and third levers (5, 6, 7), of each of said first movable member (18), said second movable member (19), said third movable member (17), and said fourth movable member (20) is longer than a width in a direction parallel to said longitudinal axis.

3. The lever switch for vehicles according to claim 2, wherein said first lever (6) has a shaft (6a) rotatably inserted into the cylinder section (7b) of said second lever (7), and said third lever (5) has a cylinder section (5e) into which the cylinder section (7b) of said second lever (7) is inserted.

4. The lever switch for vehicles according to claim 3, wherein said first, second, third, and fourth operation rods (5a, 7f, 9, 21b) are disposed above a compartment (25a) of a case (25) and are inserted into a first through hole (25b), a second through hole (25c), a third through hole (25h) and a fourth through hole (25i), respectively, bored in a movable base (21) of said case (25); and
   said first, second, third, and fourth movable members (17, 18, 19, 20) are respectively guided along a first guide wall (25d), a second guide wall (25g), a third guide wall (25e) and fourth guide walls (25f) formed on a lower surface of said compartment (25a).

5. The lever switch for vehicles according to claim 4, wherein said third lever (5) is passed through a first notch section (25k) formed on an inner wall of said case (25) and projected out of said case (25), and said third lever (5) is formed integrally with a boot (5b) having a flared opening arranged to cover said first notch section (25k).

6. The lever switch for vehicles according to claim 5, wherein said boot (5b) of said lever (5) is formed such that said opening is formed in an approximately half-ball shape having a center which is a swing axis of said lever (5) approximately.

7. The lever switch for vehicles according to claim 6, wherein said case (25) is provided with a second notch section (25*j*) outside said first notch section (25*k*), and a boot receiving space (25*m*) for receiving said boot (5*b*) swingably is provided between said first notch section (25*k*) and said second notch section (25*j*).

8. The lever switch for vehicles according to claim 7, wherein said boot receiving space (25*m*) of said case (25) is covered together with said case (25) by a cover member (32) having a boot covering section (32*b*) for covering said boot (5*b*).

9. The lever switch for vehicles according to claim 1, wherein said first lever (6) has a shaft (6*a*) rotatably inserted into the cylinder section (7*b*) of said second lever (7), and said third lever (5) has a cylinder section (5*e*) into which the cylinder section (7*b*) of said second lever (7) is inserted.

10. The lever switch for vehicles according to claim 9, wherein said first, second, third, and fourth operation rods (5*a*, 7*f*, 9, 21*b*) are disposed above a compartment (25*a*) of a case (25) and are inserted into a first through hole (25*b*), a second through hole (25*c*), a third through hole (25*h*) and a fourth through hole (25*i*), respectively, bored in a movable base (21) of said case (25); and said first, second, third, and fourth movable members (17, 18, 19, 20) are respectively guided along a first guide wall (25*d*), a second guide wall (25*g*), a third guide wall (25*e*) and fourth guide walls (25*f*) formed on a lower surface of said compartment (25*a*).

11. A lever switch for vehicles, comprising:

a case (25) having an inner wall with a first notch section (25*k*) formed therein; and a lever (5) passed through said first notch section (25*k*) and projected out of said case (25), said lever (5) being formed with an integral boot (5*b*) having a flared opening arranged to cover said first notch section (25*k*).

12. The lever switch for vehicles according to claim 11, wherein said boot (5*b*) of said lever (5) is formed such that said opening is formed in an approximately half-ball shape having a center which is a swing axis of said lever (5) approximately.

13. The lever switch for vehicles according to claim 12, wherein said case (25) is provided with a second notch section (25*j*) outside said first notch section (25*k*), and a boot receiving space (25*m*) for receiving said boot (5*b*) swingably is provided between said first notch section (25*k*) and said second notch section (25*j*).

14. The lever switch for vehicles according to claim 13, wherein said boot receiving space (25*m*) of said case (25) is covered together with said case (25) by a cover member (32) having a boot covering section (32*b*) for covering said boot (5*b*).

* * * * *